United States Patent
Warner

(10) Patent No.: US 11,403,769 B2
(45) Date of Patent: Aug. 2, 2022

(54) BREAK AWAY MOCAP TRACKER

(71) Applicant: LUCASFILM ENTERTAINMENT COMPANY LTD., San Francisco, CA (US)

(72) Inventor: Paige M. Warner, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 16 days.

(21) Appl. No.: 17/009,501

(22) Filed: Sep. 1, 2020

(65) Prior Publication Data
US 2022/0067948 A1 Mar. 3, 2022

(51) Int. Cl.
| | |
|---|---|
| *G06T 7/215* | (2017.01) |
| *G06T 7/292* | (2017.01) |
| *G06F 3/02* | (2006.01) |
| *G06T 7/00* | (2017.01) |
| *G06T 7/30* | (2017.01) |
| *G06T 17/10* | (2006.01) |

(52) U.S. Cl.
CPC ............ *G06T 7/215* (2017.01); *G06F 3/0202* (2013.01); *G06T 7/292* (2017.01); *G06T 7/30* (2017.01); *G06T 7/97* (2017.01); *G06T 17/10* (2013.01)

(58) Field of Classification Search
CPC .. G06T 7/215; G06T 7/97; G06T 7/30; G06T 17/10; G06T 7/292; G06F 3/0202
See application file for complete search history.

(56) References Cited

U.S. PATENT DOCUMENTS

| | | | | | |
|---|---|---|---|---|---|
| 5,889,550 | A | * | 3/1999 | Reynolds | H04N 5/222 348/139 |
| 2009/0289749 | A1 | * | 11/2009 | Fullerton | F41G 11/001 335/306 |
| 2014/0098225 | A1 | * | 4/2014 | Rodriguez | G03B 15/03 348/143 |
| 2015/0309392 | A1 | * | 10/2015 | Wendt | G03B 17/12 396/536 |
| 2019/0372614 | A1 | * | 12/2019 | Kovacs | H04M 1/04 |

\* cited by examiner

*Primary Examiner* — Zhitong Chen
(74) *Attorney, Agent, or Firm* — Kilpatrick Townsend & Stockton LLP

(57) ABSTRACT

A motion capture tracking device comprising a base portion including a first alignment feature, a first magnetic element and an attachment mechanism operative to mechanically couple the base portion to a rod, a detachable end cap configured to be removably mated with the base portion, and a plurality of motion capture markers coupled to the end cap. The detachable end cap can include a second alignment feature and a second magnetic element, such that, during a mating event in which the detachable end cap is coupled to the base portion, the second alignment feature cooperates with the first alignment feature to ensure that the base portion and detachable end cap are mated in accordance with a unique registration and the second magnetic feature cooperates with the first magnetic feature to magnetically retain the detachable end cap in physical contact with the base portion upon completion of the mating event.

20 Claims, 4 Drawing Sheets

BREAK AWAY MOCAP TRACKER

BACKGROUND OF THE INVENTION

A camera creates a record of a three-dimensional (3D) physical scene with a two-dimensional (2D) image. The image may be recorded on a film or as a digital 2D array of pixel values. Computer-based animation and special effects techniques often involve capturing a series of images of one or more actors (or other objects within a scene) with one or more cameras, each of which can have a different viewing perspective. The images from the cameras can be combined to generate a three-dimensional (3D) graphical representation of the actor(s) and scene that can be applied to an animated character or generate special effects and placed in a computer-generated 3D scene that can be used in the production of video content.

In order for the 3D representation of the actors performance within the scene to be accurate, the actors can wear motion capture suits to enable their movements to be precisely captured. Additionally, the location of each camera must be able to be accurately reproduced. Towards this end, each camera typically includes motion capture tracker objects (e.g., colored or reflective balls) that are attached to the camera (or a device fixed to the camera) so that the camera can be tracked in a motion capture volume. When more than one camera is employed, the arrangement of motion capture tracker objects on each camera is unique so that the cameras can be readily identified and distinguished from each other. At various times the motion capture tracker objects can become knocked off the cameras or otherwise dislodged. For example, when a camera operator swaps out a lens or otherwise works on the camera, the operator can bump into one or more of the motion capture tracker objects. Such events can require that the camera and its motion capture tracker object be recalibrated so that the tracking software can properly recognize and track the camera.

It can be a time consuming and tedious process to fix and recalibrate motion capture tracker objects designed to track cameras.

BRIEF SUMMARY OF THE INVENTION

Embodiments of the disclosure pertain to a motion capture tracker device and system that can be attached and quickly reattached to a camera in the event that the device gets dislodged or otherwise knocked out of calibration. In some embodiments a motion capture tracking device includes several separate components including: a base portion that can be semi-permanently attached or otherwise affixed to a camera, an end cap that can be magnetically attached to the base portion, and multiple motion capture markers. The base portion and end cap can include alignment features that allow the two components to be only coupled together in a single orientation. Since the base portion and end cap are coupled together primarily by magnetic forces, if during use the camera or the motion capture portions of the camera are bumped or otherwise contacted in a manner that might result in the end cap and motion capture markers becoming dislodged, the end cap can separate from the base portion without bending or otherwise damaging the motion capture markers. The end cap can then be quickly reattached without requiring a new, complicated and/or lengthy re-alignment and recalibration process.

Some embodiments of the disclosure pertain to a motion capture tracking device that includes a base portion, a detachable end cap and a plurality of motion capture markers coupled to the end cap. The base portion can include a first alignment feature, a first magnetic element and an attachment mechanism operative to mechanically couple the base portion to a rod. The detachable end cap can be configured to be removably mated with the base portion and can include a second alignment feature and a second magnetic element, such that, during a mating event in which the detachable end cap is coupled to the base portion, the second alignment feature cooperates with the first alignment feature to ensure that the base portion and detachable end cap are mated in accordance with a unique registration and the second magnetic feature cooperates with the first magnetic feature to magnetically retain the detachable end cap in physical contact with the base portion upon completion of the mating event.

In various implementations, the motion capture tracking device can include one or more of the following features. The base portion can include an alignment body comprising the first alignment feature and a collar coupled to the alignment body and comprising the attachment mechanism. The first alignment feature can include a sidewall surface of the alignment body and the second alignment feature can include a sidewall surface of the detachable end cap that defines a recess that aligns with and fits over the sidewall surface of the alignment body. The collar can include a generally circular channel extending longitudinally through the collar towards the base portion and can further include a clamping mechanism operable to tighten the collar to mechanically secure the base portion to a rod. The clamping mechanism can include a first threaded screw hole perpendicular to the generally circular channel and a screw that can be threaded into the screw hole to tighten the clamping mechanism around the rod. The end cap can include a plurality of threaded holes distributed around an outer periphery of the end cap. Each motion capture marker can include a post having a first end with threads operable to couple the post to one of the plurality of threaded holes and a motion tracker object coupled to a second end of the post. The motion tracker object attached to the second end of the post can be a retro-reflective motion tracker ball. And/or, the base portion and the end cap can each be made from a plastic material and at least one of the first magnetic element or the second magnetic element can be a magnet while the other of the first magnetic element and the second magnetic element comprises either a magnet or a plate made from a magnetic material.

According to some embodiments, a motion capture tracking device includes: a base portion, a detachable end cap coupled to the base portion and a plurality of motion capture markers coupled to the end cap. The base portion can include: (i) an alignment body having first and second opposing surfaces and a sidewall extending fully around an outer perimeter of the alignment body between the first and second opposing surfaces; (ii) one or more base portion magnetic elements coupled to the alignment body; and (iii) a collar coupled to and extending away from second surface of the alignment body, where the collar includes a generally circular channel extending longitudinally through the collar and a clamping mechanism operable to tighten the collar to mechanically secure the base portion to a rod. The detachable end cap can include: (i) a front plate; (ii) a sidewall extending away from the front plate towards the base portion and defining an end cap recess having an inner perimeter such that the alignment body of the base portion can be fitted within the recess and mated with the detachable cap; and (iii) one or more end cap magnetic elements coupled to the detachable end cap and operable to cooperate with the one or more base portion magnetic elements to magnetically secure the end cap to the base portion when the end cap recess is fitted over the alignment body.

In still other embodiments, a motion capture tracking device can include a base portion and an end cap magnetically attachable to the base portion. The base portion can have an alignment body having an exterior perimeter sidewall surface that defines a polarized mounting surface; one or more first magnetic elements coupled to the alignment body; and a collar coupled to and extending away from the alignment body, the collar having a generally circular channel extending longitudinally through the collar towards the alignment body and including at least one fastener hole extending into the collar at an angle perpendicular to the generally circular channel and a fastener operable to tighten the collar around an object inserted into the generally circular channel to secure the base portion to the object. The end cap can have a front plate; a sidewall extending away from the front plate and defining an end cap recess opposite the front plate and having an inner perimeter such that the end cap can be fitted over the alignment body and mated with the base portion; one or more second magnetic elements coupled to the end cap and operable to cooperate with the one or more first magnetic elements to magnetically secure the end cap to the base portion when the end cap recess is fitted over the alignment body; and a plurality of threaded holes spaced apart along an exterior surface of the sidewall. In some implementations a plurality of motion capture markers can be coupled to the end cap, with each motion capture marker in the plurality of motion capture markers comprising a post having a first threaded end that is coupled to one of the threaded holes in the plurality of threaded holes, a second end opposite the first end, and a motion tracker ball coupled to the second end; where at two or more of the plurality of motion capture markers have posts of different lengths.

To better understand the nature and advantages of these and other embodiments of the invention, reference should be made to the following description and the accompanying figures. It is to be understood, however, that each of the figures is provided for the purpose of illustration only and is not intended as a definition of the limits of the scope of the present invention. It is to be further understood that, while numerous specific details are set forth in the description below in order to provide a thorough understanding of the invention, a person of skill in the art will recognize that the invention may be practiced without some or all of these specific details.

DETAILED DESCRIPTION OF THE INVENTION

Embodiments of the invention pertain to a motion capture tracker device and system that can be attached and quickly reattached to a camera in the event that the device gets dislodged or otherwise knocked out of calibration.

Example Performance Environment

Figure 1:
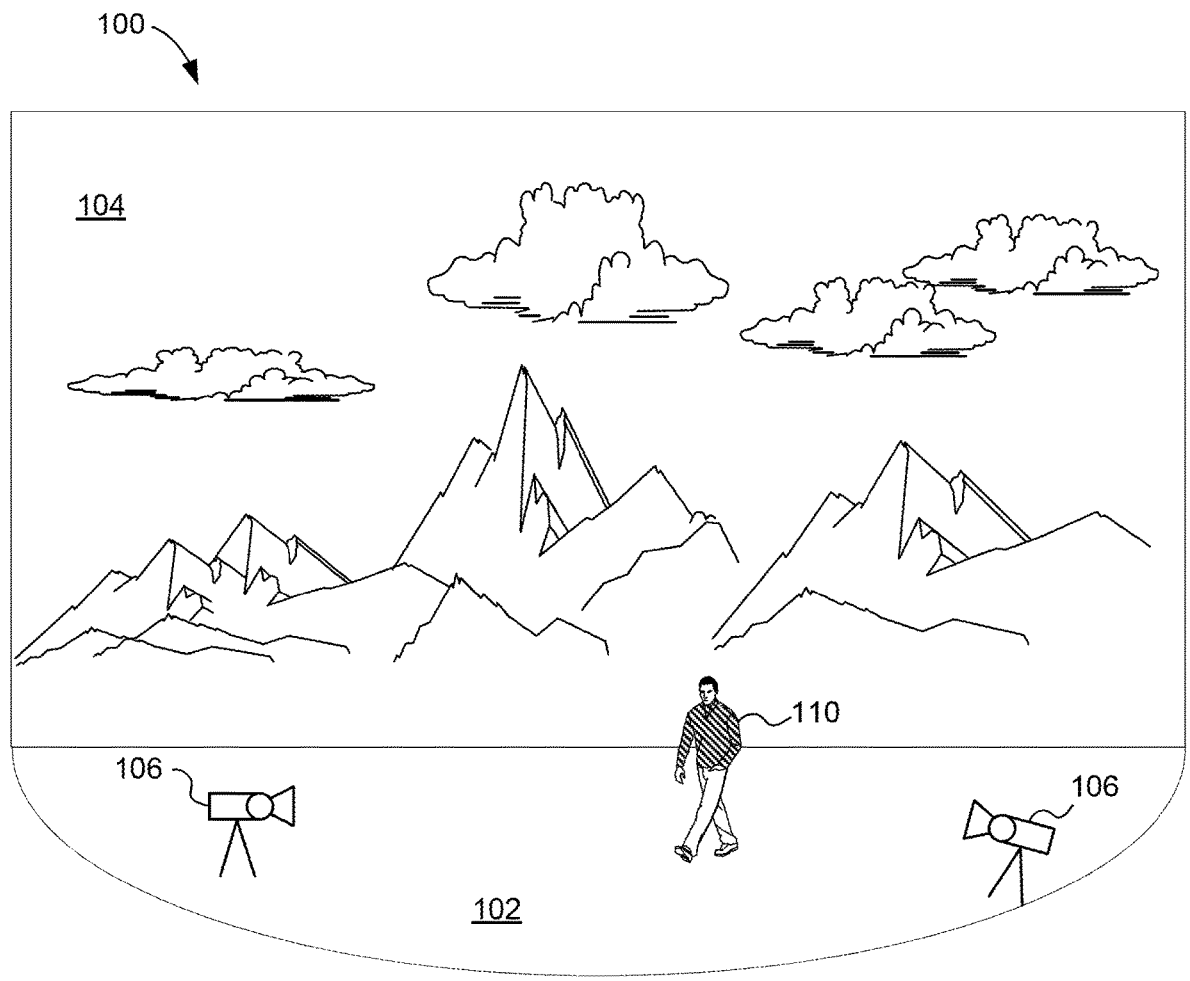
FIG. 1 is a simplified diagram of an exemplary environment in which embodiments of the present invention can be employed.

In order to better understand and appreciate embodiments of the invention, reference is made below to FIG. 1, which is a simplified diagram of an exemplary environment 100 in which embodiments of the present invention can be employed. Environment 100 can include a performance area 102 and a backdrop 104. Performance area 102 can be a stage or any area in which one or more actors can carry out a performance. Backdrop 104 can be a green screen that facilitates post-production work or can include scenery that is appropriate for the performance. For example and solely for illustrative purposes, in FIG. 1 backdrop 104 is an outdoor scene that includes mountains and clouds. In some instances, some or all of the scenery of backdrop 104 can be generated on a computer and displayed on one or more displays, such as large LCD or LED displays, that surround performance area 102.

One or more cameras 106 can be positioned at strategic locations (e.g., locations that help with the capture and/or locations that are desirable for the director cinematically) within environment 100 to capture the performance of an actor 110. The cameras 106 and/or actor 110 can have motion capture markers attached to them so that a motion capture system (not shown) can generate a three-dimensional representation of the performance that can be used for generating special effects, creating animations and the like. For example, actor 110 can wear a motion capture suit and/or have motion capture markers attached at key locations on the actor's body as is known in the art.

Cameras 106 can also include motion capture markers so that the location and orientation of the cameras can be precisely tracked. Previously known motion capture markers for cameras often included multiple posts of different lengths that included motion tacker balls mounted at the end of each post. The posts could be attached to the camera or to a rig or frame affixed to the camera (e.g., a matte box) in a fixed relationship, which as explained above, could be disrupted if the motion capture markers were accidentally bumped or otherwise dislodged by a camera operator, technician or an object within or near the performance area. Such an event could then require that the motion capture markers be reattached and/or realigned and that the camera be recalibrated in accordance with a tedious recalibration process by the motion capture software to ensure that it can be properly tracked.

Embodiments of the invention provide a motion capture tracking device that reduces the need for such a recalibration process. Motion capture tracking devices according to some embodiments disclosed herein include several separate components including: a base portion that can be semi-permanently attached or otherwise affixed to a camera, an end cap that can be magnetically attached to the base portion, and multiple motion capture markers. The base portion and end cap can include alignment features that allow the two components to be unambiguously mated in a unique registration (i.e., coupled together in a single orientation). Additionally, the multiple motion capture markers can be attached to the end cap in an arrangement that is unique to the end cap, and thus unique to the camera that the end cap is mechanically attached to through the base portion. In this manner, if during use the camera or the motion capture tracking device attached to the camera are bumped or otherwise contacted in a manner that might result in the end cap and motion capture markers becoming dislodged, the end cap can separate from the base portion and then be quickly reattached without requiring a new, complicated and/or lengthy re-alignment and recalibration process. To further illustrate some of the features and advantages of various embodiments of the disclosure, reference is made to FIGS. 2-7 below.

A First Illustrative Embodiment

Figure 2:
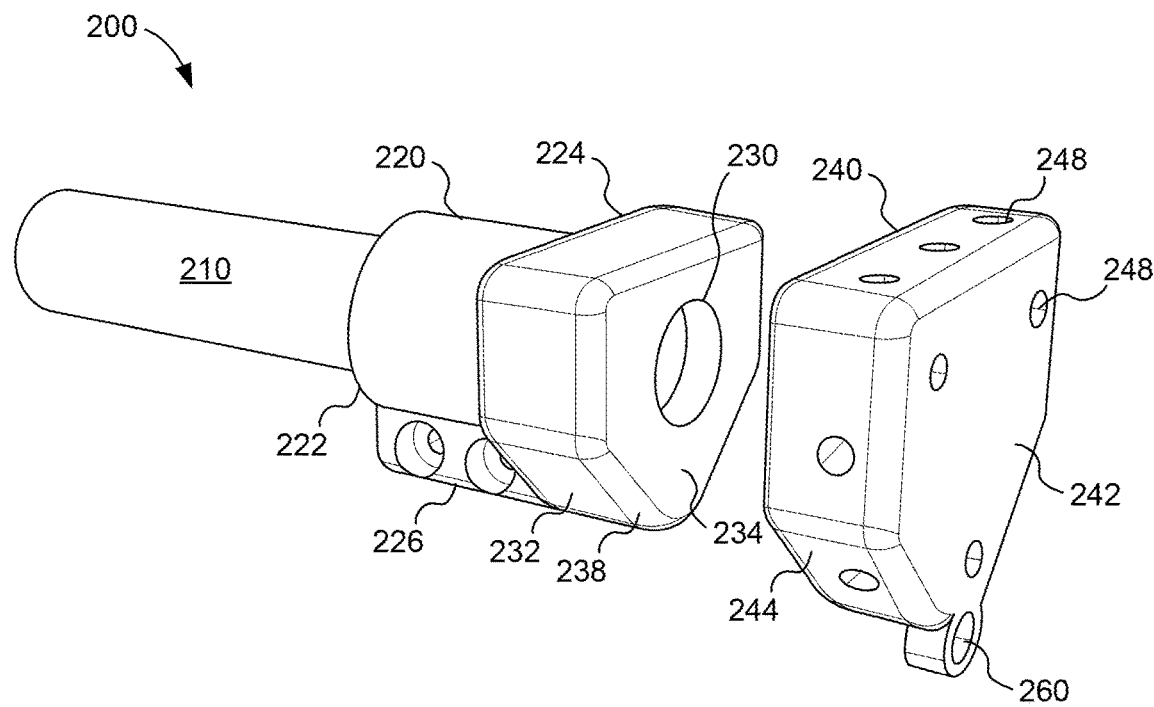
FIG. 2 is a simplified front perspective view of a motion capture tracker device according to some embodiments in a detached position and without motion tracker balls attached to the device.
Figure 3:
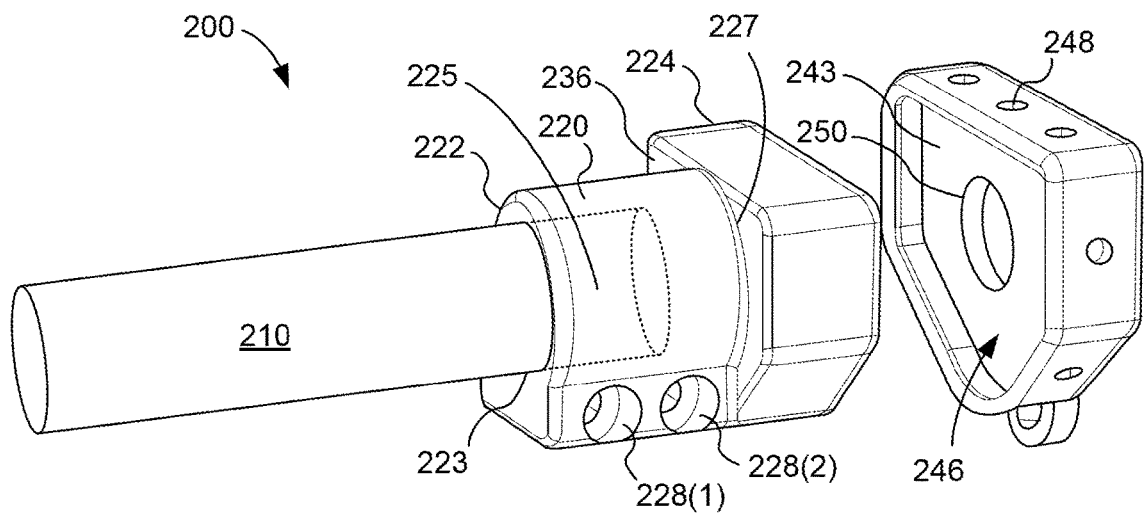
FIG. 3 is a simplified rear perspective view of the motion capture tracker device shown in FIG. 2.

FIG. 2 is a simplified front perspective view of a motion capture tracker device 200 according to some embodiments and FIG. 3 is a simplified rear perspective view of motion capture tracker device 200. Motion capture tracker device 200 is shown in FIGS. 2 and 3 in a detached position and without motion capture markers attached to the device. As shown, motion tracker device 200 includes a base portion 220 and an end cap 240 that can be fitted over and magnetically attached to the base portion. Base portion 220 can include a collar 222 or similar attachment feature and an alignment body 224. The collar can be coupled to and extend away from the alignment body. In some embodiments collar 222 and alignment body 224 can be a single integral unit that can be formed by an injection molding process or can be formed with a three-dimensional printer.

Collar 222 can have receptacle or channel 225 with an opening at a first end 223 of the collar and extending longitudinally into the collar. Channel 225 can be sized and shaped to be receive a rod 210, such as a 15 mm rod that is commonly used in cinematography applications to mechanically attach accessories to a matte box or other portion of a video camera. The collar can also include an attachment mechanism 226, such as one or more screws or clamps, that can secure collar 222 (and thus secure base portion 220) to rod 210 in a semi-permanent manner (i.e., it can only be removed from the rod by undoing the attachment mechanism by, for example, loosening the screws or loosening the clamp). The other end of the rod (not shown) can be mechanically attached to the camera or matte box.

In the embodiment shown in FIGS. 2 and 3, the attachment mechanism 226 is a clamp that can be tightened around rod 210 by two screws that can extend through first and second openings 228(1) and 228(2) (collectively referred to as openings 228), respectively, and screw into a threaded portion of the clamp (not shown) on the side of clamp 226 opposite the openings 228. As the screws are tightened, clamp 226 reduces the size of opening 225 and inner walls of the clamp compress against rod 210 to secure the rod within the collar. In some embodiments a compressible insert (e.g., a rubber liner or an elastomeric or soft plastic insert) can be disposed within opening 225 around rod 210 to improve the friction fit between rod 210 and the clamp. Rod 210 can, in turn, be attached to a camera (or to a matte box or similar device which is attached to a camera) to mechanically secure base portion 220 of motion tracker device 200 to the camera.

Alignment body 224 is coupled to a second end 227 of collar 222, opposite the first end 223. Alignment body 224 can include front and rear opposing surfaces 234 and 236, respectively, and a sidewall 232 extending fully around an outer perimeter of the alignment body between the front and rear surfaces 234, 236. In some embodiments, front surface 234 and sidewall 232 define a shape that acts as an alignment key for end cap 240 such there is only one orientation that the end cap can be inserted over the front face 234 and sidewall 232 to mate the end cap with the base portion. In this manner the end cap can be said to be polarized with respect to the base portion. For example, in the embodiment depicted in FIGS. 2 and 3, front surface 234 and sidewall 232 define a pentagon shaped component that defines a single mating orientation for end cap 240 as described in more detail below.

As mentioned above, end cap 240 can be magnetically attached to base portion 220. Towards this end, each of the end cap 240 and base portion 220 includes one or more magnetic elements. In some embodiments base portion 220 (or at least alignment body 224) can be made of a metal and end cap 240 can include one or more magnets to attach the end cap to the base portion. In other embodiments, end cap 240 can be made of a metal and base portion 220 can include one or more magnets to attach the end cap to the base portion. In still other embodiments, both base portion 220 and end cap 240 are made from plastic or another rigid, non-magnetic material and each of the base portion and end cap include one or more magnetic elements to implement the magnetic attachment.

As shown in FIG. 2, alignment body 224 can include a cutout 230 formed in front surface 234 in which a magnetic element (not shown) can be disposed. Similarly, end cap 240 can also include a cutout 250 (shown in FIG. 3) formed in an inner surface 243 of front plate 242 discussed below. Cutout 250 can be aligned with cutout 230 and in which a magnetic element can be disposed. In embodiments where each of alignment body 224 and end cap 240 are made from a plastic or other non-magnetic material, at least one of magnetic elements positioned in cutout 230 or cutout 250 is a magnet and the other magnetic element can also be a magnet or can be a metallic plate that the magnet in the other cutout is attracted too. While motion capture tracking device 200 is shown in FIGS. 2 and 3 as having singular cutouts in each of alignment body 224 and end cap 240, it is to be appreciated that embodiments of the disclosure are not limited to any particular position, number or arrangement of magnetic elements. As just one additional example, in other embodiments, multiple magnetic elements can be positioned along an inner perimeter of each of alignment body 224 and end cap 240 and aligned such that the multiple magnetic elements in alignment body 224 cooperate with the multiple magnetic elements in end cap 240 to secure the end cap to the base portion.

The magnetic elements in alignment body 224 and end cap 240 can be selected such that the strength of the magnetic field coupling the end cap to the base portion is sufficient to secure the end cap, along with any motion capture markers coupled to the end cap, to the base portion while allowing the end cap to be dislodged from the base portion when exposed to an external force before either rod 210 or any of the motion capture markers coupled to the end cap either bend or break either of which would require that the motion capture tracking device be fixed and recalibrated to ensure accurate tracking.

Detachable end cap 240 can include a front plate 242 and a sidewall 244 that extends away from front plate 242 to define an end cap recess 246. An inner perimeter of end cap recess 246 can be sized and shaped to have the same contour as, but be slightly larger than, the outer perimeter of sidewall 232 such that alignment body 224 of base portion 220 can be fitted within the recess to be mated with the detachable cap. Thus, in one sense base portion 220 can be considered a male connector that can plug into the female receptacle of end cap 240. The magnetic force applied by the magnetic elements in each of alignment body 224 and end cap 240 on each other when the alignment body and end cap are positioned near each other can help guide the alignment body into recess 246. Additionally, in some embodiments the interface 238 between sidewall 232 and front surface 234 of the alignment body can be tapered or curved to further facilitate mating between the end cap and base portion.

Multiple motion capture markers (not shown in FIGS. 2 and 3) can be attached to the end cap. In some embodiments the end cap can include multiple threaded openings 248 distributed around one or more exterior surfaces of the end cap, such as the end cap sidewall. In some embodiments end cap 240 can include at least one threaded opening 248 on each of the different faces of sidewall 244 as well as one or more threaded openings 248 on front plate 242. The motion capture markers can be attached to the end cap at various ones of the threaded openings. Having multiple threaded openings 248 distributed around the perimeter of end cap 240 allow for a large degree of flexibility in deciding where to attach motion capture markers to the end cap.

A variety of different sizes, shapes and types of motion capture markers can be coupled to end cap 240. As one example, each motion capture marker can include a post that has a first, threaded end that can be screwed into one of the threaded openings and a second end, opposite the first end, to which a motion tracker object, such as a motion capture ball, can be attached. The posts can be different lengths and can be attached to various locations of threaded openings 248 on the end cap such that the combination of rods and motion capture elements at the end of the rods projecting away from the end cap is unique to the end cap, and thus unique to the camera that the end cap is mechanically attached to through the base.

Figure 4:
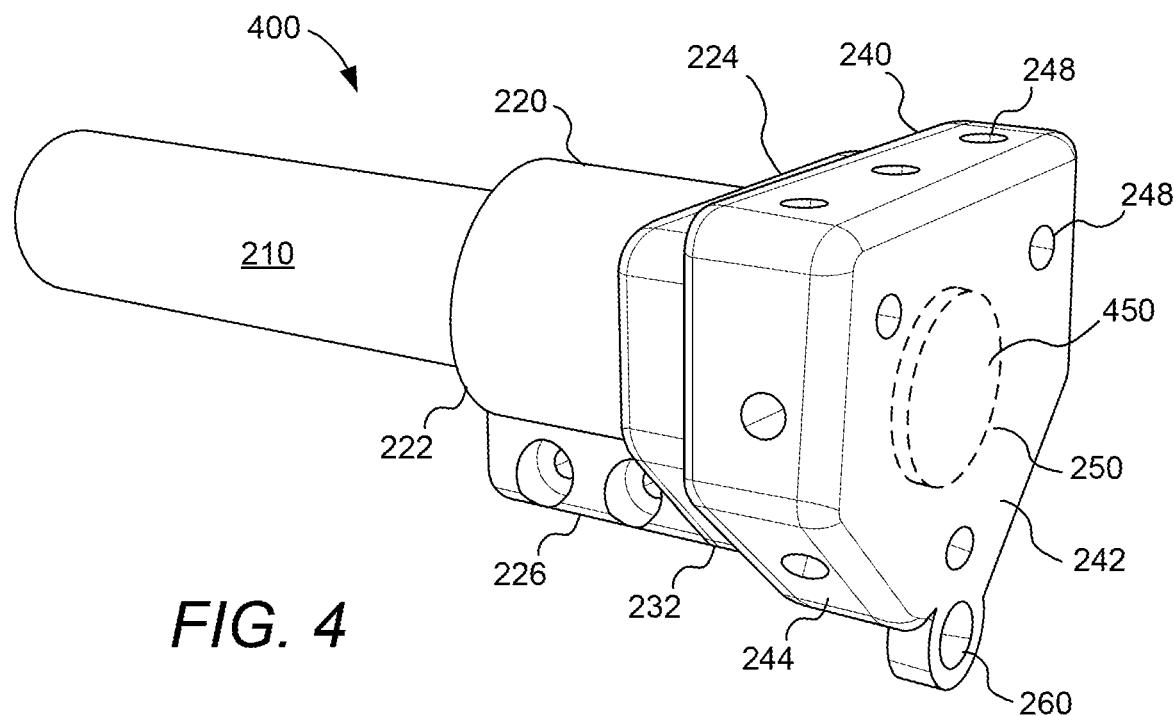
FIG. 4 is a simplified front perspective view of the motion capture tracker device shown in FIG. 2 in an attached position.

Reference is now made to FIG. 4, which is a simplified front perspective view of a motion capture tracker device 400 to some embodiments with the end cap attached to the base portion. Motion capture tracker device 400 can be representative of motion capture tracker device 200 shown in FIGS. 2 and 3 and, for ease of illustration, the same reference numbers are used in FIG. 4 to refer to similar or identical components of the motion capture tracker device discussed above with respect to FIGS. 2 and 3. Shown in dotted lines in FIG. 4, motion capture tracker device 400 includes a magnetic element 450 disposed within cutout 250 of end cap 240, positioned on inner portion of plate 242. The magnetic element 450 can be adhered to inside of plate 242 within cutout 250 using a glue or other adhesive or any suitable means of attaching the magnet to the end cap. In some embodiments, cutout 250 can include one or more features, such as a lip or a shelf or tabs that help secure magnetic element 450 to the end cap.

The magnetic element 450 magnetically couples with a corresponding magnetic element (not shown) in alignment body 224 to magnetically secure the end cap to the base portion. As explained above, in this manner, if during use the camera or the motion capture portions of the camera are bumped or otherwise contacted in a manner that might result in the end cap becoming dislodged, the end cap can separate from the base portion and then be quickly reattached without requiring a new, complicated and/or lengthy re-alignment and recalibration process.

To further simplify the reattachment process, an eyelet 260 can be included as part of end cap 240. The eyelet 260 enables a string, an elastic cord, cable or similar device (not shown) to be tied to eyelet 260 and looped around rod 210 or base portion 220 such that when end cap 240 is dislodged from the base portion, the end cap will dangle from base portion 220 by the string, cord or cable thereby allowing the end cap to be quickly retrieved and reattached to the base portion.

Motion Capture Markers

Figure 5:
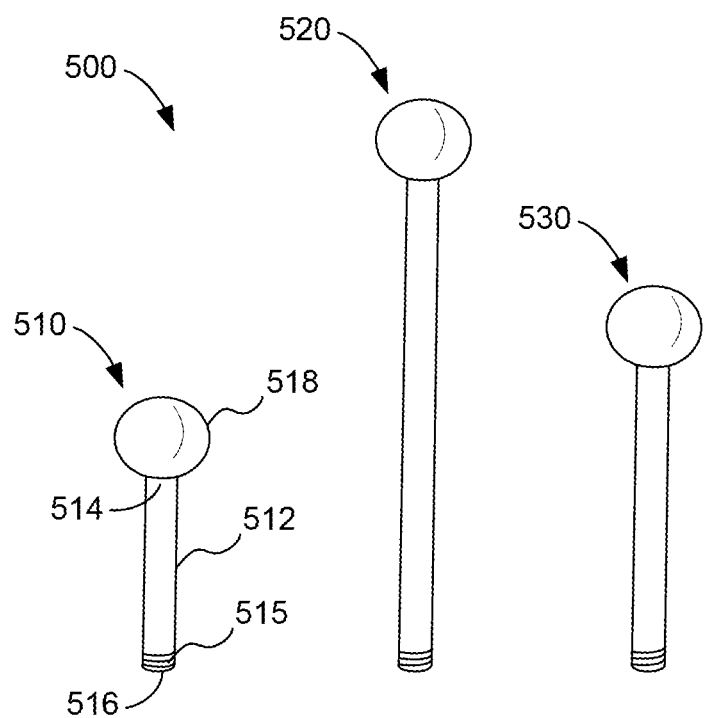
FIG. 5 is a simplified illustration of several different motion capture markers according to some embodiments.

FIG. 5 is a simplified illustration of several different motion capture markers 500 according to some embodiments that can be coupled to end cap 240 as discussed above. FIG. 5 depicts three different motion capture markers 510, 520 and 530. Each of the markers 510, 520, 530 includes a post 512 that has first and second opposing ends 514, 516. First end 514 can be coupled to a motion tracker object 518, such as a motion tracker ball, which can include a colored or reflective surface that is readily detectable by motion capture software. Second end 516 can include a threaded portion 515 that can screw into any one of the threaded holes 248 in end cap 240 to couple the motion capture marker to the end cap.

In a typical embodiment, a motion capture tracking device, such as device 200 or 400, can include 3-6 or more motion capture markers coupled to the end cap. In order to help create a tracking pattern for the device 200 or 400 that can be easily identified by motion capture tracking software as a pattern unique to that device (and thus unique to the camera that the device 200 or 400 is mechanically secured to), the posts 512 for some or all of the motion capture markers 510, 520, 530 can differ in length as shown in FIG. 5. As a non-limiting example, in some embodiments each post 512 can be between 2 and 6 inches. Between the differing lengths of the posts and the different locations that each the motion capture markers can be attached to on the end cap, a very large number of possible arrangements of the motion capture markers exist to enable motion capture software to identify different cameras and other objects in an environment such as environment 100 that includes multiple different cameras or objects tracked by different motion capture tracker devices according to embodiments of the disclosure.

An Illustrative Embodiment with Motion Capture Markers

Figure 6:
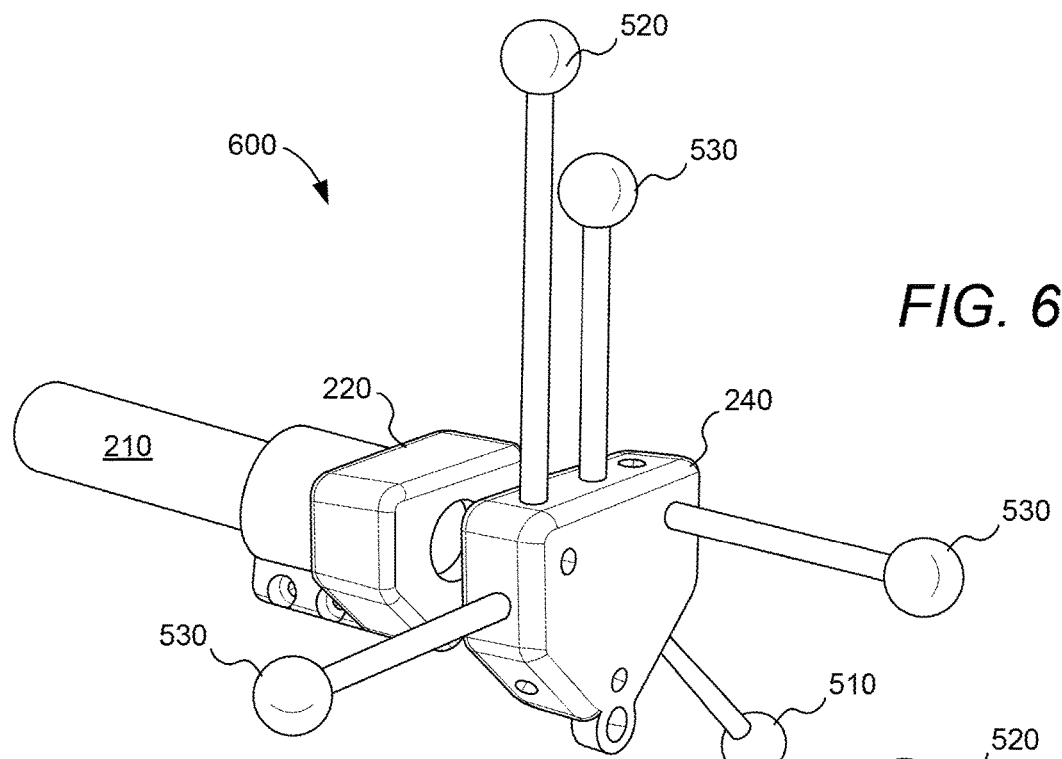
FIG. 6 is a simplified front perspective view of a motion capture tracker device according to some embodiments in a detached position and with motion capture markers attached to the device.
Figure 7:
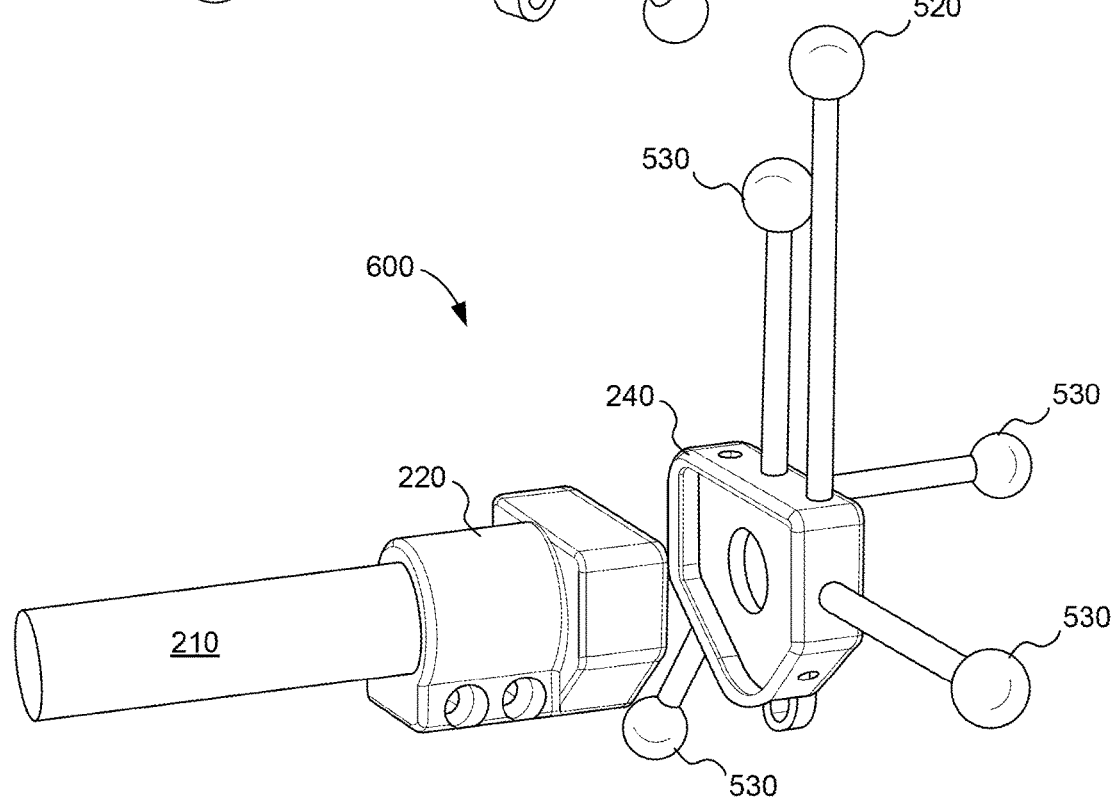
FIG. 7 is a simplified rear perspective view of the motion capture tracker device shown in FIG. 6.

FIG. 6 is a simplified front perspective view of a motion capture tracker device 600 according to some embodiments, and FIG. 7 is a simplified rear perspective view of the motion capture tracker 600. Motion capture tracker device 600 is shown in FIGS. 6 and 7 in a detached position—that is, with end cap 240 spaced apart from base portion 220 instead of the end cap being fitted over and magnetically attached to the base cap. Motion capture tracker device 600 can be similar to motion capture devices 200 and 400 and thus reference numbers are only included for selected common components including rod 210, base portion 220 and end cap 240. It is to be understood, however, that motion capture tracker device 600 can include all of the features of motion capture tracker devices 400 and 600.

Motion capture tracker device 600 is shown with multiple motion capture markers, five motion capture markers in the depicted embodiment, attached to end cap 240. Specifically, tracker device 600 is shown with one short-post motion capture marker 510, three medium-post motion capture objects 520 and one long-post motion capture object 530 coupled to five of the ten (10) potential threaded holes 548 distributed around an outer periphery of the end cap 540. As discussed above, the number of motion capture markers attached to the end cap and the particular arrangement of motion capture markers around the end cap can be selected to be a pattern unique to each camera or object tracked in environment 100 to enable motion capture software to easily identify the tracked object at all possible positions of the object within the motion capture space of environment 100.

Additional Examples and Embodiments

In the foregoing specification, aspects of the invention are described with reference to specific embodiments thereof, but those skilled in the art will recognize that the invention is not limited thereto. For example, while embodiments described above illustrated one particular alignment scheme that enabled the base portion and the end cap to be mated in a single orientation, any appropriate alignment scheme that provides for the two components to be uniquely registered to each other can be employed. As a few examples, in some embodiments one or more of the following alignment techniques can be used: the alignment body can include a sidewall that defines a female recess or receptacle and the end cap can be sized and shaped to fit within or plug into the recess; one of the alignment body or end cap can have one or more posts extending outward while the other of the alignment body or end cap can include one or more corresponding channels to receive the posts; one of the alignment body or end cap can include one or more tracks extending longitudinally along the sidewall while the other component can include channels aligned with the tracks that allow the tracks to slide through the channels during the matting event; and/or magnets can be arranged in the alignment body and end cap that only attract each in a single clocked position that sets the unique registration between the two components. Also, the collar is an optional component in some embodiments and any suitable alternative mechanism can be employed to mechanically attach the base portion to a camera or matte box. For example, in some embodiments the base portion can be screwed directly into a matte box or other accessory attached to a camera or other object, in some embodiments the base portion can include a rod coupled to the alignment body and the rod can be attached to a matte box or other accessory. Additionally, when a collar is employed, the clamping mechanism can vary and include any suitable clamping mechanism that allows the collar to tighten onto a rod or other object that can attach the base portion to the camera as would be understood by a person of skill in the art. And, while embodiments described above used motion capture markers that included posts and tracker balls attached to the end of the posts, any suitable motion capture marker system can be used as long as the motion capture markers can be arranged in a layout or manner that uniquely identifies the motion capture tracker object (and thus the camera) from other objects being tracked for motion capture purposes in the environment.

A skilled artisan will also realize that various features and aspects of the above-described invention can be used individually or jointly. Further, embodiments can be utilized in any number of environments and applications beyond those described herein without departing from the broader spirit and scope of the specification. The specification and drawings are, accordingly, to be regarded as illustrative rather than restrictive. Additionally, for the purposes of explanation, numerous specific details have been set forth in order to provide a thorough understanding of various embodiments of the present invention. It will be apparent, however, to one skilled in the art that embodiments of the present invention may be practiced without some of these specific details. In other instances, well-known structures and devices may have been shown in block diagram or schematic form.

This description has provided exemplary embodiments only, and is not intended to limit the scope, applicability, or configuration of the disclosure. Rather, this description of the exemplary embodiments provides those skilled in the art with an enabling description for implementing an exemplary embodiment. It should be understood that various changes may be made in the function and arrangement of elements without departing from the spirit and scope of the invention as set forth in the appended claims.

What is claimed is:

1. A motion capture tracking device comprising:
    a base portion including a first alignment feature, a first magnetic element and an attachment mechanism operative to mechanically couple the base portion to a rod used to attach accessories to a camera;
    a detachable end cap configured to be removably mated with the base portion, the detachable end cap including a second alignment feature and a second magnetic element, wherein during a mating event in which the detachable end cap is coupled to the base portion, the second alignment feature cooperates with the first alignment feature to ensure that the base portion and detachable end cap are mated in accordance with a unique registration and the second magnetic element cooperates with the first magnetic element to magnetically retain the detachable end cap in physical contact with the base portion upon completion of the mating event; and
    a plurality of motion capture markers coupled to the detachable end cap.

2. The motion capture tracking device set forth in claim 1 wherein the base portion includes an alignment body comprising the first alignment feature and a collar coupled to the alignment body and comprising the attachment mechanism.

3. The motion capture tracking device set forth in claim 2 wherein the first alignment feature comprises a sidewall surface of the alignment body and the second alignment feature comprises a sidewall surface of the detachable end cap defining a recess that aligns with and fits over the sidewall surface of the alignment body.

4. The motion capture tracking device set forth in claim 2 wherein the collar includes a generally circular channel extending longitudinally through the collar towards the base portion and further includes a clamping mechanism operable to tighten the collar to mechanically secure the base portion to a rod.

5. The motion capture tracking device set forth in claim 4 wherein the clamping mechanism includes a first threaded screw hole perpendicular to the generally circular channel and a screw that can be threaded into the first threaded screw hole to tighten the clamping mechanism around the rod.

6. The motion capture tracking device set forth in claim 1 wherein the detachable end cap includes a plurality of threaded holes distributed around an outer periphery of the detachable end cap.

7. The motion capture tracking device set forth in claim 6 wherein each motion capture markers in the plurality of motion capture markers includes a post having a first end with threads operable to couple the post to one of the plurality of threaded holes and a motion tracker object coupled to a second end of the post.

8. The motion capture tracking device set forth in claim 7 wherein each motion tracker object attached to the second end of a post in the plurality of motion capture markers comprises a retro-reflective motion tracker ball.

9. The motion capture tracking device set forth in claim 1 wherein the base portion and the detachable end cap are each made from a plastic material and at least one of the first magnetic element or the second magnetic element comprises a magnet and the other of the first magnetic element and the second magnetic element comprises either a magnet or a plate comprising a magnetic material.

10. A motion capture tracking device comprising:
a base portion, a detachable end cap coupled to the base portion and a plurality of motion capture markers coupled to the detachable end cap;
the base portion comprising: (i) an alignment body having first and second opposing surfaces and a sidewall extending fully around an outer perimeter of the alignment body between the first and second opposing surfaces; (ii) one or more base portion magnetic elements coupled to the alignment body; and (iii) a collar coupled to and extending away from second surface of the alignment body, wherein the collar includes a generally circular channel extending longitudinally through the collar and a clamping mechanism operable to tighten the collar to mechanically secure the base portion to a rod used to attach accessories to a camera; and
the detachable end cap comprising: (i) a front plate; (ii) a sidewall extending away from the front plate towards the base portion and defining an end cap recess having an inner perimeter such that the alignment body of the base portion can be fitted within the end cap recess and mated with the detachable end cap; and (iii) one or more end cap magnetic elements coupled to the detachable end cap and operable to cooperate with the one or more base portion magnetic elements to magnetically secure the detachable end cap to the base portion when the end cap recess is fitted over the alignment body.

11. The motion capture tracking device set forth in claim 10 wherein an interface between the alignment body sidewall and the first surface extends fully around the first surface and is tapered or curved.

12. The motion capture tracking device set forth in claim 10 wherein the base portion and the detachable end cap are each made from a plastic material.

13. The motion capture tracking device set forth in claim 10 wherein the clamping mechanism includes a first threaded screw hole perpendicular to the generally circular channel and a screw that can be threaded into the first threaded screw hole to tighten the clamping mechanism around the rod.

14. The motion capture tracking device set forth in claim 10 wherein there is only one orientation in which the alignment body of the base portion can only be fitted within the end cap recess and mated with the detachable end cap.

15. The motion capture tracking device set forth in claim 10 further comprising an eyelet coupled to the detachable end cap.

16. The motion capture tracking device set forth in claim 10 wherein the detachable end cap further includes a plurality of threaded holes spaced apart along an exterior surface of the sidewall and each of the plurality of motion capture markers is coupled to the detachable end cap by one of the threaded holes in the plurality of threaded holes.

17. The motion capture tracking device set forth in claim 16 wherein each motion capture marker in the plurality of motion capture markers comprises a post having first and second opposing ends, the first end including a threaded portion enabling the post to be screwed into one of the plurality of threaded holes, the second end having a motion capture tracker object attached thereto.

18. The motion capture tracking device set forth in claim 17 wherein each motion tracker object attached to the second end of a post in the plurality of motion capture markers comprises a retro-reflective motion tracker ball.

19. A motion capture tracking device comprising:
a base portion having:
an alignment body having an exterior perimeter sidewall surface that defines a polarized mounting surface;
one or more first magnetic elements coupled to the alignment body; and
a collar coupled to and extending away from the alignment body, the collar having a generally circular channel extending longitudinally through the collar towards the alignment body and including at least one fastener hole extending into the collar at an angle perpendicular to the generally circular channel and a fastener operable to tighten the collar around an object inserted into the generally circular channel to secure the base portion to the object; and
an end cap magnetically attachable to the base portion, the end cap having:
a front plate;
an end cap sidewall extending away from the front plate and defining an end cap recess opposite the front plate and having an inner perimeter such that the end cap can be fitted over the alignment body and mated with the base portion;
one or more second magnetic elements coupled to the end cap and operable to cooperate with the one or more first magnetic elements to magnetically secure the end cap to the base portion when the end cap recess is fitted over the alignment body;
a plurality of threaded holes spaced apart along an exterior surface of the sidewall; and
a plurality of motion capture markers coupled to the end cap, each motion capture marker in the plurality of motion capture markers comprising a post having a first threaded end that is coupled to one of the threaded holes in the plurality of threaded holes, a second end opposite the first end, and a motion tracker ball coupled to the second end, wherein at two or more of the plurality of motion capture markers have posts of different lengths.

20. The motion capture tracking device set forth in claim 19 wherein the exterior perimeter sidewall surface of the alignment body and the inner perimeter of the end cap sidewall are sized and shaped such that the end cap can be mated with the end cap in a single orientation.

* * * * *